US008589162B2

(12) United States Patent
Lejeune et al.

(10) Patent No.: US 8,589,162 B2
(45) Date of Patent: Nov. 19, 2013

(54) METHOD, SYSTEM AND COMPUTER PROGRAM FOR ENHANCED SPEECH RECOGNITION OF DIGITS INPUT STRINGS

(75) Inventors: Remi Lejeune, Chatou (FR); Hubert Crepy, Boulogne (FR)

(73) Assignee: Nuance Communications, Inc., Burlington, MA (US)

( * ) Notice: Subject to any disclaimer, the term of this patent is extended or adjusted under 35 U.S.C. 154(b) by 1185 days.

(21) Appl. No.: 12/234,176

(22) Filed: Sep. 19, 2008

(65) Prior Publication Data

US 2009/0125306 A1 May 14, 2009

(51) Int. Cl.
*G10L 15/04* (2013.01)

(52) U.S. Cl.
USPC .......................................... 704/254; 704/251

(58) Field of Classification Search
USPC .......................................... 704/231, 251, 254
See application file for complete search history.

(56) References Cited

U.S. PATENT DOCUMENTS 5,677,990 A 10/1997 Junqua
5,712,957 A * 1/1998 Waibel et al. ................. 704/240
6,922,669 B2 * 7/2005 Schalk et al. ................. 704/255
6,985,861 B2 1/2006 Van Thong et al.
2003/0110035 A1 * 6/2003 Thong et al. ................. 704/254
2006/0116885 A1 6/2006 Shostak

OTHER PUBLICATIONS

Brems et al "Dialog Design for Automatic Speech Recognition of Telephone Numbers and Account Numbers," Interactive Voice Technology for Telecommunications Applications, 1994.*
Brens, D.J. Wattenbager, B.L. AT&T Bell Labs., Holmdel, NJ, USA ; Dialog design for automatic speech recognition of telephone numbers and account numbers in Interactive Voice Technology for Telecommunications Applications, 1994., Second IEEE Workshop.

* cited by examiner

*Primary Examiner* — Angela A Armstrong

(74) *Attorney, Agent, or Firm* — Wolf, Greenfield & Sacks, P.C.

(57) ABSTRACT

The present invention proposes a method, system and computer program for speech recognition. According to one embodiment, a method is provided wherein, for an expected input string divided into a plurality of expected string segments, a speech segment is received for each expected string segment. Speech recognition is then performed separately on each said speech segment via the generation, for each said speech segment, of a segment n-best list comprising n highest confidence score results. A global n-best list is then generated corresponding to the expected input string utilizing the segment n-best lists and a final global speech recognition result corresponding to said expected input string is determined via the pruning of the results of the global n-best list utilizing a pruning criterion.

20 Claims, 4 Drawing Sheets

METHOD, SYSTEM AND COMPUTER PROGRAM FOR ENHANCED SPEECH RECOGNITION OF DIGITS INPUT STRINGS

CROSS-REFERENCE TO RELATED APPLICATIONS AND CLAIM OF PRIORITY

This application claims the benefit of priority of French Patent Application No. EP 20070301383 filed on Sep. 19, 2007, and entitled "Method, system and computer program for enhanced speech recognition of digits input strings" hereby incorporated by reference herein to the maximum extent allowable under the law.

BACKGROUND

1. Technical Field

The present invention relates to the field of computerized speech recognition, and more particularly in the field of computerized speech recognition on input speech comprising a long string of digits, numbers or letters, using context-free grammar 2. Description of the Related Art Nowadays, more and more voice applications comprise speech recognition for strings used as validation keys, such as in telephony applications in the banking and commercial domains. However in speech recognition in these domains it often proves difficult for users to obtain efficient recognition of their speech, and users can quickly get lost in the process.

In the case of characters constituting non semantic strings, grammars are too open to perform effectively because context-free grammars do not allow the use of additional contextual and statistic rules, as opposed to spoken language recognition.

Conventional speech recognition methods and systems generate, for a given expected input speech, a list of results or hypothesis with a weight or confidence score for each of the results. Such methods and systems provide an n-best list, i.e., a list of results or hypothesis with the "n" highest confidence scores, where "n" is some integer.

Such speech recognition methods typically include analyzing the received sounds and comparing them to memorized sounds for known phonemes and/or words. Possibly matching phonemes and/or words combinations are then validated through analysis according to the rules of a model or "grammar", and sorted according to a statistical method which defines a confidence score for each possible solution. The "n" results with the highest confidence score are then stored in an "n-best list", sorted and associated with their respective confidence scores.

Depending to the language to be recognized, the rules of a grammar may includes several different pronunciations for the same chain of characters.

For speech input with semantic meaning, the context is used for rating the probability that given words to be combined together, thus giving an average for computing confidence scores of their combination. In such case, the grammar or model is generally called a "statistical language model"

In the case of a string containing successive characters or numeric figures with no semantic meaning, such statistical rules may be unavailable, and the grammar is then called "context-free".

Moreover, such a non-semantic string may be spoken in several different ways, e.g. by grouping several successive figures differently in a global number in French. The efficiency of recognition is thus especially decreased in such context-free grammar.

In conventional methods or systems, the results of the n-best list are typically then pruned with a pruning algorithm using constraining rules, and the result with higher confidence score after pruning is taken as the result of the speech recognition. One such pruning algorithm frequently used with credit card numbers is the Luhn algorithm which defines, within all right sized numbers, the 10% that are valid as credit card numbers.

Especially in the case of context-free grammar, speech recognition can still be improved. Indeed, the methods and systems implementing pruning an n-best list with an algorithm, such as the Luhn algorithm, still suffer from misrecognitions that increase with the length of the input speech and the pauses users often insert while speaking. In case of misrecognition, the user has to speak again the entire speech, which yields to poor user experience especially for long input strings.

BRIEF SUMMARY

Embodiments of the present invention include methods, systems, and program products for enhanced speech recognition of digit input strings. According to one embodiment, a method is provided wherein, for an expected input string divided into a plurality of expected string segments, a speech segment is received for each expected string segment. Speech recognition is then performed separately on each said speech segment via the generation, for each said speech segment, of a segment n-best list comprising n highest confidence score results. A global n-best list is then generated corresponding to the expected input string utilizing the segment n-best lists and a final global speech recognition result corresponding to said expected input string is determined via the pruning of the results of the global n-best list utilizing a pruning criterion.

BRIEF DESCRIPTION OF THE DRAWINGS

Embodiments of the present invention, as well as a preferred mode of use, further aspects and advantages thereof, will best be understood by reference to the following detailed description of an illustrative detailed embodiment when read in conjunction with the accompanying drawings, wherein.

DETAILED DESCRIPTION OF ILLUSTRATIVE EMBODIMENTS

Figure 1:
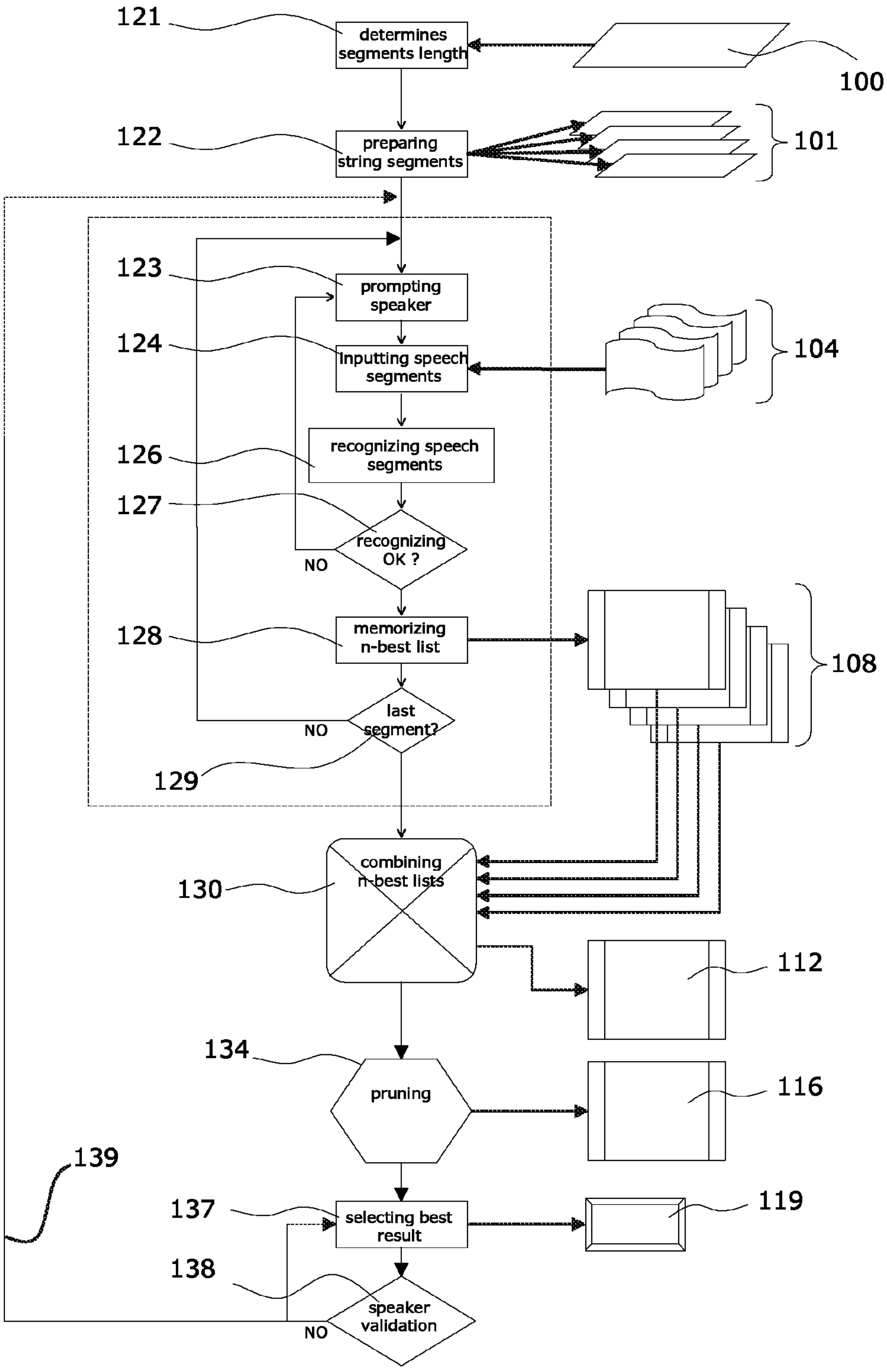
FIG. 1 is a schematic view of the method according to a first embodiment of the present invention.

In the following specifications, elements common to several figures are referenced through a common identifier. A method, system, and program product for enhanced speech recognition of digit input strings is described. According to one embodiment, a method is provided wherein, for an expected input string divided into a plurality of expected string segments, a speech segment is received for each expected string segment. Speech recognition is then performed separately on each said speech segment via the generation, for each said speech segment, of a segment n-best list comprising n highest confidence score results. A global n-best list is then generated corresponding to the expected input string utilizing the segment n-best lists and a final global speech recognition result corresponding to said expected input string is determined via the pruning of the results of the global n-best list utilizing a pruning criterion.

Thus, embodiments of the present invention provide an n-best list of results for each speech segment, which is combined with the n-best list results of the other segments to obtain several hypotheses for the entire expected input string. These hypotheses are combined into a list of results which are then pruned to recognize the input speech. Combining separate recognition with global pruning on combined results enables improved recognition efficiency on the global string. The described embodiments also allow users/speakers to utter segments which are shorter than the entire string to be recognized, thereby providing improved clarity and reduced segment/utterance loss. Recognizing segments shorter than the entire string also enables better recognition on each segment, especially with context-free grammar, e.g. by reducing the number of opportunities for a speaker to combine digits of the segment.

In another embodiment, a method is provided which includes prompting the speaker to repeat a speech segment when speech recognition accuracy fails to meet a predetermined threshold. In cases of segment misrecognition, the user may repeat only the misrecognized segment rather than being forced to repeat the entire string of input speech.

Speech recognition according to an embodiment of the present invention may further comprise associating a weight to each segment result in the n-best lists for each speech segment where such weights are determined according to the probability for this segment result to correspond to the string actually spoken for this segment. For each speech segment, the n-best results are classified in the n-best list according to the weight of each result of this segment result list.

In the global n-best list for the entire expected input string, each result is obtained in the described embodiment by combining together one result from the n-best list for each segment of input speech. This global n-best list may include as many results as there are possible combinations between all the results of the n-best lists for all of the segments. For example, if there are “x” segments, there will be “x” n-best lists. If each of the “x” n-best lists comprise “y” results, then there can be x.y results in the global n-best list.

In another method embodiment, a weight is determined for and associated with each result in the global n-best list, the weight being calculated according to the weights of the results that were used for composing the result in the n-best list. In the described embodiment, determining a weight for each result in the global n-best list may further comprise adding the weights of the results from the segment n-best lists that were combined together to obtain the corresponding result in the global n-best list. The weight of a global result in the global n-best list may thus be determined or calculated by adding the weights of the segment results composing this global result, or by applying to these weights any other statistical or mathematical or logical formula.

According to yet another embodiment of the invention, the length of the spoken speech segments is known and is used for reducing the number of combination possibilities for speaking the characters or figures to be recognized. Speech recognition for at least one speech segment thus involves a grammar analysis based on a determined exact length of the corresponding expected string segment. Alternatively, performing speech recognition for at least one speech segment may involve a grammar analysis based only on a determined maximum length of the corresponding expected string segment.

In another embodiment, a method is provided which comprises prompting a speaker to speak each segment of the input speech, and to repeat a segment when speech recognition on this segment is not sufficiently accurate (e.g., fails to meet a predetermined threshold accuracy level). In this embodiment, global input speech is inputted segment by segment and speech recognition is performed on each speech segment after the input of this segment. In case of misrecognition, the user is prompted to re-speak the last input segment before being prompted for the next segment. Consequently, all the expected segments are ensured to have been satisfactorily inputted/received at the end of the speech input process, such that no misrecognition on any segment of the entire input speech has occurred. Additionally, the described method embodiment ensures that the user’s place is not lost while speaking the expected input string, as he/she is prompted step by step while speaking the input string, the speaking of the expected input string is progressive, and he/she does not have to return to a previous segment of string once it has been received and recognized.

In the described embodiment, a result is selected in the final list, obtained after pruning, to be taken as matching the entire expected input string. The selection of the result in the final list may be realised utilizing the weights of the final results in the final list. The result selected may be the result associated with the best (highest) weight in the final list. In an alternative embodiment, the degree to which the selected final recognition result matches the expected result is determined by presenting (e.g. via visual display or audio playback) the selected final result to the speaker and prompting him/her to confirm whether or not (or the degree to which) it matches the expected output. If the selected final result is incorrect, another final result is selected in the final list, e.g. according to the weights of the remaining results in this final list.

In an alternative embodiment, segmenting rules that are known to the speaker are utilized, such as the same segmenting technique or rule that is typically or ordinarily used for speaking or printing the string to be input. Thus, at least one segment of the input speech is determined utilizing data related to the type of string input. Such rules may come from a number of sources in various embodiments, e.g. separating strings into two or three digits for string input identified as a phone number, or differently according to the language used or the country or social context. Pruning algorithms utilized in conjunction with embodiments of the present invention may comprise a database look-up, a validation code, a checksum or other mathematical formula or constraining rule.

Advantageously, embodiments of the present invention may be implemented to perform speech recognition on validation keys, such as for credit card numbers in commercial or banking telephony applications. In such instances, the entire expected input string may comprise a credit card number. Embodiments of the present invention may be beneficially adapted to such implementations as most credit card numbers are written segmented into chunks of a few digits having a length typically varying between two to four digits. Accordingly, an expected input string can be segmented in a manner consistent with the written grouping of the digits. In the described embodiments in which credit card numbers are the subject of speech recognition being implemented the Luhn algorithm may be utilized as the pruning algorithm which defines the 10% of number combinations which are valid credit card numbers.

In another embodiment, the input speech is input without prompting the speaker for each segment speech. Rather, in this embodiment, the entire string to be recognized is spoken with a pause between its component chunks or segments. Pauses may be specified to the speaker, or inputted from her/him. A segmenting module detects the pauses between the segments within the entire input speech and divides the input speech into speech segments based on the pauses.

For applications where the length of the global expected input string is not known a priori, the speaker may be prompted at each segment to determine whether the present segment is the last segment to be recognized. If the speaker indicates that additional segments remain, additional speech recognition operations are performed until the last segment has been processed and announced.

In other embodiments of the present invention segment length may be utilized after having been determined or received from the speaker. For example, in one embodiment grammar analysis is restricted according to the determined or received length In yet another embodiment of the present invention a Voice-XML application is provided which implements the described method operations utilizing a computer program product comprising instructions for carrying out the steps of such a method.

FIG. 1 is a schematic view of the method according to a first embodiment of the present invention. In the illustrated embodiment of FIG. 1, an expected input string 100 is processed, such processing may be accomplished according to one or more embodiments of the present invention utilizing a segmenting module (not illustrated). Initially in the process embodiment depicted in FIG. 1, the length of the expected component string segments of the expected input string to be recognized is determined (process block 121) via the receipt of data representing the described length or the processing of expected input string 100. Thereafter, the expected input string is divided (process block 122) into a plurality of expected segments strings 101.

Thereafter the speaker is prompted (process block 123) to speak the first segment speech 104 corresponding to a first expected string segment 101 of the expected input string 100. Segment speech 104 is then input/spoken by the speaker and received in the system (process block 124) after which speech recognition is performed (process block 126) on the received segment speech 104, issuing a segment n-best list 108 for the current segment speech 104.

After the speech recognition operation has been performed, a check is made to determine whether the speech recognition performed on the current segment speech 104 was performed correctly (process block 127). An indication that current segment has been incorrectly recognized may take the form of the return of misrecognition information by the Voice XML engine, i.e. when the highest confidence score in the associated n-best list is below a given rejection threshold, when a predetermined number of n-best list results fail to meet or exceed such a rejection threshold, or other similar metrics. If an indication is received that the speech recognition has not been performed satisfactorily, the speaker is again prompted (process block 123) to repeat the current segment. The described process operations are then repeated (process blocks 124 to 127) until the speech recognition performed on the current segment is determined to meet the predetermined accuracy threshold as illustrated in FIG. 1.

The n-best list (108) obtained is then stored or "memorized" (process block 128) for the current segment. The depicted operations (process blocks 123 to 128) are then repeated until a determination is made that all segments have been processed (process block 129) as shown.

For each expected string segment 101, a speech segment 104 is thus received and recognized in the illustrated method embodiment to generate an n-best list 108 comprising the n-best hypothesis or results matching each segment. In each of the n-best lists 108, the n-best matching results are associated with a confidence score or weight. The weight for a result reflects the probability that the result is the correct speech recognition result for the segment associated with the n-best list comprising this result.

When speech has been received for the whole expected input string 100, then the n-best lists 108 of all of these segment n-best lists 108 are entered in a combining module that combines (process block 130) the results of these n-best lists 108 to provide a global n-best list 112 comprising proposed matching results for the entire expected input string 100. The global n-best list 112 of the embodiment of FIG. 1 comprises possible or probable results for the entire expected input string. Each global result in global n-best list 112 is associated with a confidence score or weight calculated in conjunction with the combination (process block 130) of the component n-best lists 108 according to the respective weights of the segment results from the segment n-best lists 108 that were combined to obtain the global result.

Global n-best list 112 is thereafter entered to a pruning module. Where the results of global n-best list 112 are filtered based on one or several pruning criteria or algorithms, to generate a final list 116 comprising the only results of global n-best list 112 satisfying the pruning criteria or algorithms. The "best" or highest confidence score or weight result in final list 116, is selected (process block 137) as the best matching result 119 for the entire expected string 100.

As schematically represented in FIG. 1, method embodiments of the present invention may optionally comprise additional operations (process block 138) to verify the speech recognition result with the speaker (e.g., to determine whether the best weighing or confidence scored result 119 actually matches with the spoken input 104. According to one embodiment this is performed by spelling best matching result 119 to the speaker and requesting confirmation of the speech recognition result. In case of invalidation by the speaker, another result of final n-best list 116 may be proposed, (e.g., the final result with the second heaviest weight). If no correct result is found in final n-best list 116, the illustrated process embodiment may (process element 139) start again from the beginning.

Utilizing embodiments of the present invention global speech recognition reliability may be improved by approximately 30% compared with a standard recognition without pruning, and by around 12% compared to one-shot recognition with pruning.

Figure 2:
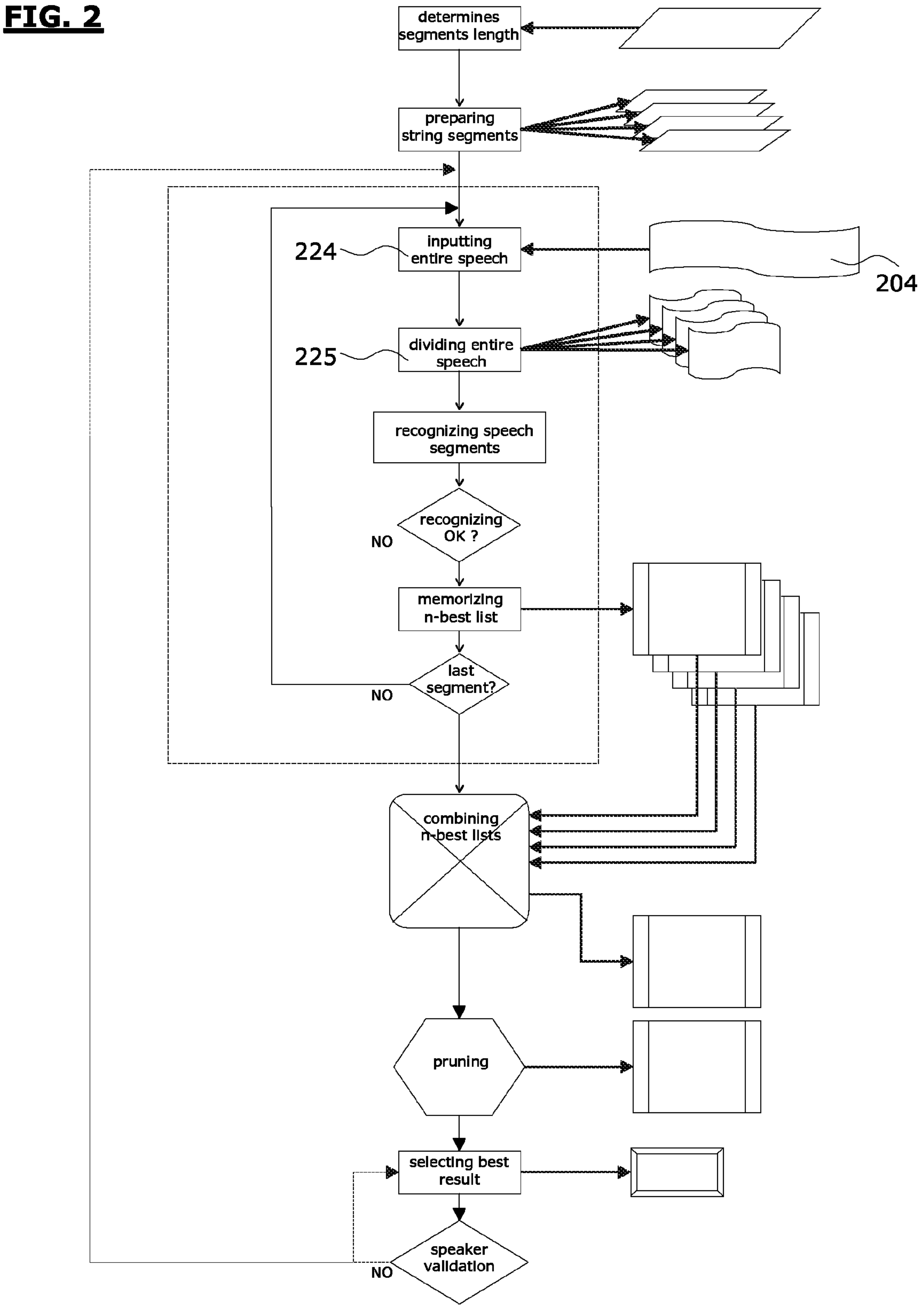
FIG. 2 is a schematic view of the method according to a second embodiment of the present invention.

FIG. 2 is a schematic view of the method according to a second embodiment of the present invention. In this second embodiment, an entire speech string 100 is spoken by the speaker without intermediate prompting between segments 104, and possibly even before the first segment. In the depicted embodiment, data representing segment length is known by the speaker or transmitted to her/him, and is in turn input (process block 224) an entire speech 204 corresponding to the entire expected string 101.

During this input (process block 224), the speaker speaks the expected segments strings 101 successively, separated by a signal such as a pause or a key word, e.g. "stop", or a given data or acoustic signal e.g. pressing the "*" key. A segmenting module (not illustrated) then detects the pauses or signals between the speech segments 104 of the input speech 100 and divides (process block 225) the input speech 100 into segments with respect to theses pauses or signals.

The illustrated method embodiment additionally includes receiving via input an entire input speech 204 corresponding to the entire expected string 100; determining one or several time positions within the entire input speech 102, according to at least one signal input by and received from the speaker for signalling one or several segment input speeches 104; dividing the entire input speech 102 into several segment input speeches 104 according to the identified positions.

Figure 3:
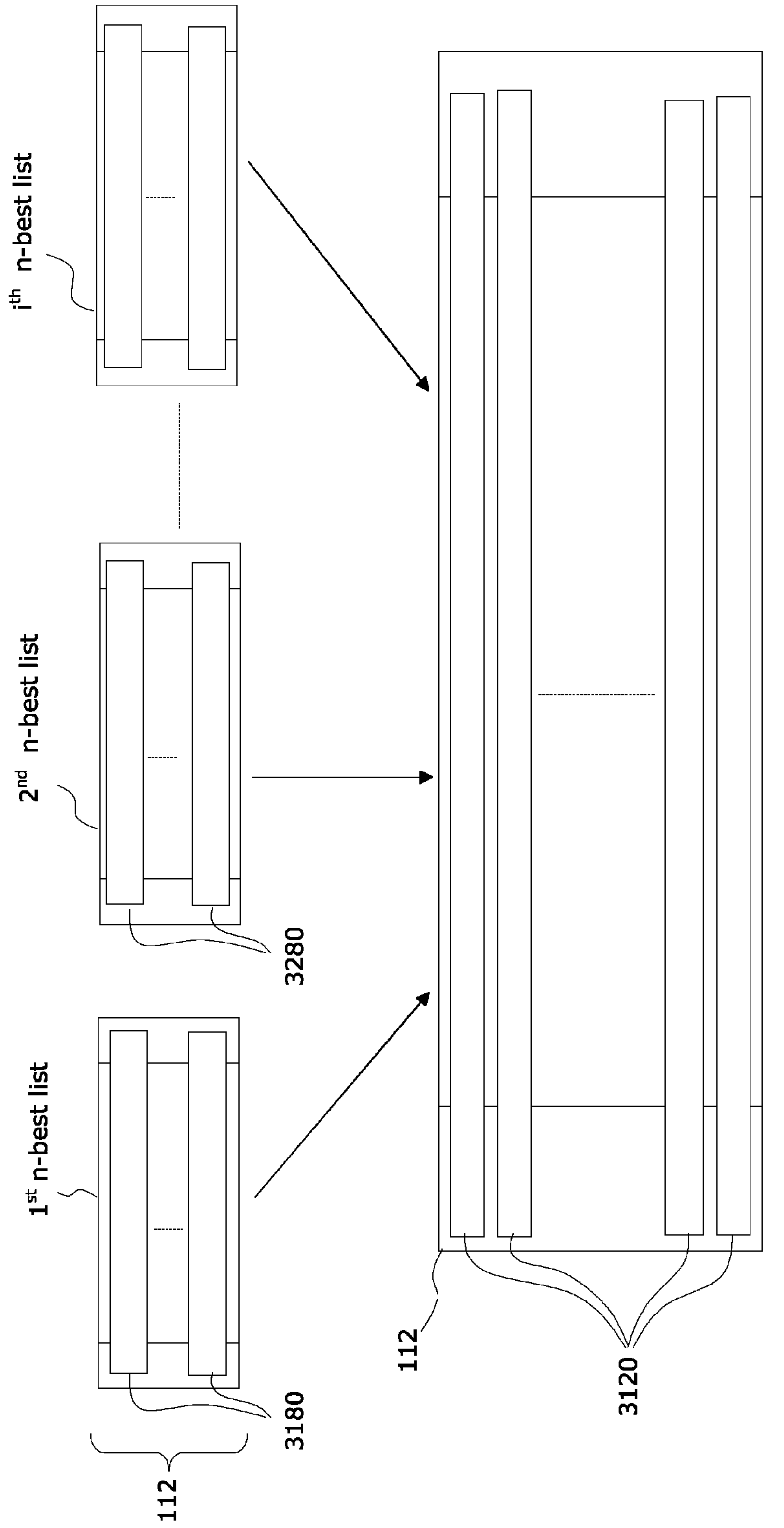
FIG. 3 schematically illustrates an example of combining n-best segment lists into a global n-best list, according to an embodiment of the present invention invention.

FIG. 3 schematically illustrates an example of combining n-best segment lists into a global n-best list, according to an embodiment of the present invention invention. Assuming that dci is the ith segment, asri,j is the result ranked j in the n-best list of speech recognition result on dci and asri,j.confscore its associated confidence score or weight. According to one embodiment, a combining module is provided which combines results 3180, 3280 and their corresponding confidence scores 3181, 3281 into a global n-best list 112. In the described embodiment, this global n-best list 112 is generated as follows.

Assuming that there are m segments, every ith segment issued a n-best list 108 with a number of ji results, thus:

results for segment 1 are: "asr1,1" to "asr1,j1"

results for segment 2 are: "asr2,1" to "asr2,j2"

up to . . .

results for segment m are: "asrm,1" to "asrm,jm"

For each combination of value of j1 to jm indicated, one global result is built by concatenating the corresponding results:

"asr1,1 to j1" & "asr2,1 to j2" & . . . & "asrm,1 to jm" thus:

"asr1,1" & "asr2,1" . . . "asrm,1"

"asr1,1" & "asr2,1" . . . "asrm,2"

up to . . .

"asr1,j1" & "asr2,j2" . . . "asrm,jm"

For each of these global results 3120, an associated confidence score 3121 is calculated. In the described embodiment, this associated confidence score is calculated for each global result by adding the respective confidence scores 3181, 3281 of the concatenated segment results 3180, 3280.

Assuming the confidence score of result "asrx" has the value asrx.confscore, then any global result such as:

"asr1,i1" & "asr2,i2" . . . "asrm,im"

will have a confidence score of:

asr1,i1.confscore+asr2,i2.confscore+ . . . +asrm,im.confscore

Other algorithms or formulas may be used to calculate the confidence score for each result in the global n-best list 112. In the newly created global n-best list 112 there are j1xj2x . . . xjm results, each of the results being associated to a confidence score. The global n-best list 112 is thereafter received and processed by a pruning module in the described embodiment, and all the global results which do not comply with the pruning criteria or algorithm(s) are discarded and eliminated (see process block 134 of FIG. 1). The pruning module provides thus a final n-best list 116. In this final n-best list, final results are sorted in decreasing order based on their confidence score or weight.

The result in the final n-best list 116 with the highest confidence score is selected as the best or final matching result 119 for expected input string 100. The checking module may then check or verify (see process block 138 of FIG. 1) the actual matching of this result 119 with the actual spoken input speech 100 by asking the speaker to confirm the speech recognition result. If the speaker discards the proposed final result, a second best result in the final n-best list 116 is proposed to the speaker, and so on until either a validated matching result is found or all proposed results are exhausted.

Figure 4:
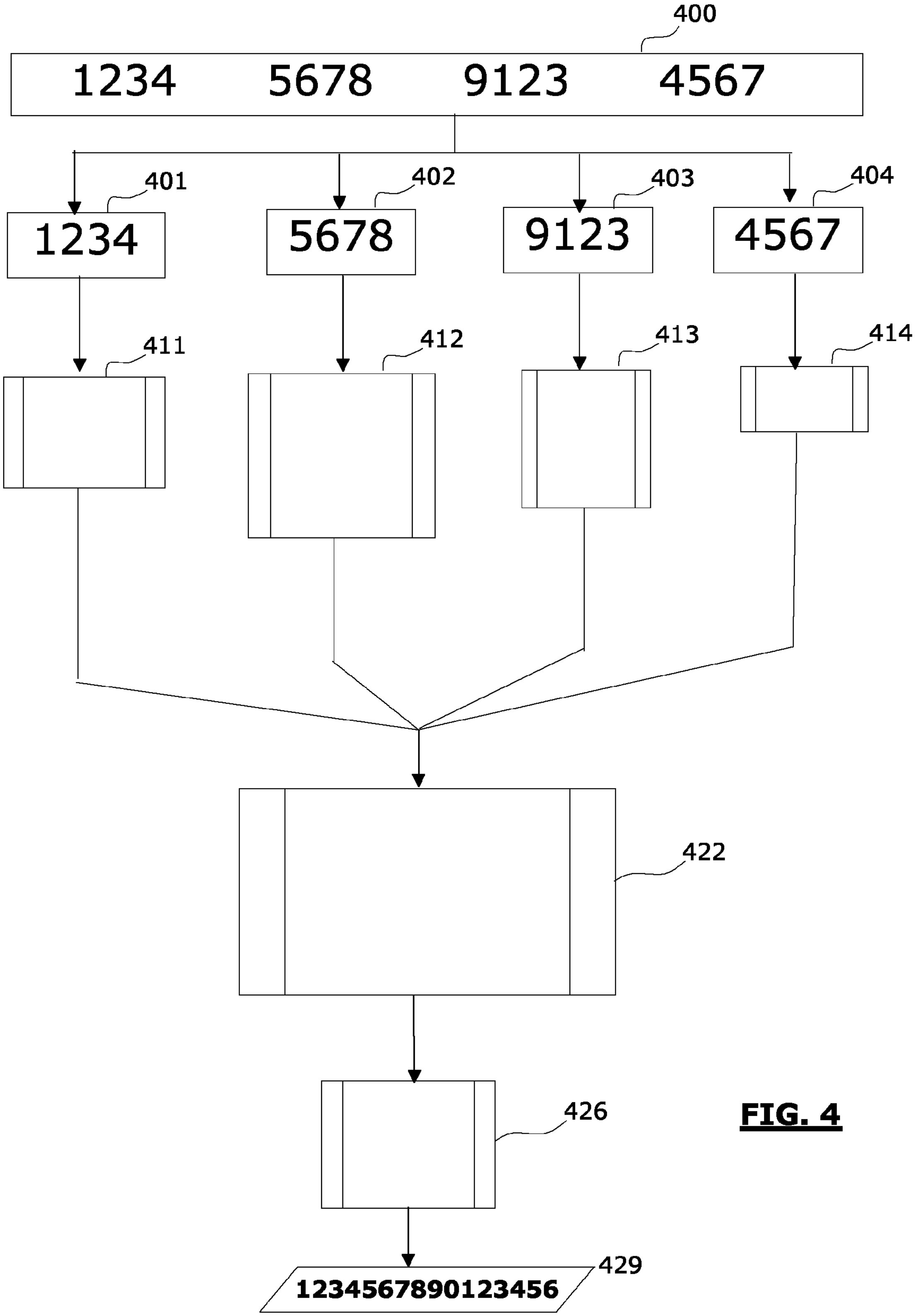
FIG. 4 schematically illustrates an example of speech recognition according to an embodiment of the present invention performed on a credit card number.

FIG. 4 schematically illustrates an example of speech recognition according to an embodiment of the present invention performed on a credit card number 400. The expected credit card number 400 is composed of 16 integer digits split in four chunks or segments of 4 digits each. For each of the described chunks, the speaker is prompted to speak or utter the four digits of the chunk, inputting four segment speech 401, 402, 403 and 404. Speech recognition may then be performed on each segment speech 401, 402, 403, 404 and four segment n-best lists 411, 412, 413, 414 generated. The issued segment n-best lists then combined (see process block 130 of FIG. 1) by a combining module and a global n-best list 422 is generated.

The results in the global n-best 422 list are then pruned (see process block 134 of FIG. 1) utilizing pruning module and a pruning method or algorithm. According to one embodiment, the Luhn algorithm is utilized.

Following pruning, a final n-best list 426 is obtained, in which the results are sorted in decreasing order based on confidence score. The best matching result for the credit card number to be recognized is issued as the recognized value 429 for the expected credit card number 400.

While the invention has been particularly shown and described mainly with reference to a preferred embodiment, it will be understood that various changes in form and detail may be made therein without departing from the spirit and scope of the invention.

What is claimed is:

1. A method for speech recognition, the method comprising:

for an expected input string comprising a plurality of expected string segments comprising a first expected string segment and a second expected string segment, receiving a first speech segment for the first expected string segment and a second speech segment for the second expected string segment, wherein the first speech segment is different from the second speech segment;

performing speech recognition separately on the first speech segment and the second speech segment, wherein said performing speech recognition comprises generating a first segment n-best list and a second segment n-best list, the first segment n-best list comprising n highest confidence score results of said speech recognition on the first speech segment and the second segment n-best list comprising n highest confidence score results of said speech recognition on the second speech segment, where n comprises at least one integer;

generating a global n-best list corresponding to said expected input string, wherein the global n-best list comprises a plurality of results each generated at least in part by combining a result from said first segment n-best list with a result from said second segment n-best list; and determining a final global speech recognition result corresponding to said expected input string, wherein said determining said final global speech recognition result comprises pruning results of said global n-best list utilizing a pruning criterion.

2. The method according to claim 1, wherein receiving the first speech segment for the first expected string segment and receiving the second speech segment for the second expected string segment further comprises:

receiving the first speech segment corresponding to the first expected string segment from a speaker; and prompting the speaker to speak the second speech segment corresponding to the second expected string segment.

3. The method according to claim 2, further comprising:

receiving data representing a length of at least one expected string segment of said plurality of expected string segments from said speaker; and restricting, utilizing said data, a grammar analysis of a speech recognition on said at least one expected string segment.

4. The method according to claim 1, wherein performing speech recognition comprises:

performing a grammar analysis speech recognition utilizing a determined maximum length of the expected input string.

5. The method according to claim 1, wherein performing speech recognition comprises:

performing a grammar analysis speech recognition utilizing a determined exact length of the expected input string.

6. The method according to claim 1, further comprising: receiving a single continuous speech segment input corresponding to said expected input string from a speaker;

determining one or more time positions within said single continuous speech segment input utilizing a signal received from said speaker to indicate one or more input speech segments; and dividing said single continuous speech segment input into a plurality of input speech segments utilizing said one or more time positions.

7. The method according to claim 1, further comprising:

determining a weight for each result in said global n-best list, wherein said determining said weight comprises calculating each said weight utilizing a plurality of weights associated with corresponding segment n-best lists results composing said each result in said global n-best list.

8. The method according to claim 7, wherein calculating each said weight comprises:

summing said plurality of weights associated with said corresponding segment n-best lists results.

9. The method according to claim 1, further comprising:

prompting a speaker to repeat a speech segment in response to a determination that speech recognition performed on said speech segment fails to meet a predetermined accuracy threshold.

10. The method according to claim 1, further comprising:

determining an accuracy level of said final global speech recognition result utilizing user input.

11. The method according to claim 1, wherein the expected input string corresponds to a credit card number.

12. The method according to claim 11, wherein the pruning criterion comprises the Luhn algorithm.

13. The method according to claim 1, wherein the first segment n-best list comprises a first number of results and the second segment n-best list comprises a second number of results, and the first number is different from the second number.

14. The method according to claim 1, wherein generating a global n-best list comprises:

generating a first result of the global n-best list by concatenating a first result of the first segment n-best list with a second result of the second segment n-best list; and generating a second result of the global n-best list by concatenating the first result of the first segment n-list with a third result of the second segment n-best list.

15. One or more machine-readable storage devices having stored therein a program product, which, when executed by a set of one or more processors, causes the set of one or more processors to perform a method comprising:

for an expected input string comprising a plurality of expected string segments comprising a first expected string segment and a second expected string segment, receiving a first speech segment for the first expected string segment and a second speech segment for the second expected string segment, wherein the first speech segment is different from the second speech segment;

performing speech recognition separately on the first speech segment and the second speech segment, wherein said performing speech recognition comprises generating a first segment n-best list and a second segment n-best list, the first segment n-best list comprising n highest confidence score results of said speech recognition on the first speech segment, and the second segment n-best list comprising n highest confidence score results of said speech recognition on the second speech segment, where n comprises at least one integer;

generating a global n-best list corresponding to said expected input string, wherein the global n-best list comprises a plurality of results each generated at least in part by combining a result from said first segment n-best list with a result from said second segment n-best list; and determining a final global speech recognition result corresponding to said expected input string, wherein said determining said final global speech recognition result comprises pruning results of said global n-best list utilizing a pruning criterion.

16. The one or more machine-readable storage devices according to claim 15, wherein generating a global n-best list comprises:

generating a first result of the global n-best list by concatenating a first result of the first segment n-best list with a second result of the second segment n-best list; and generating a second result of the global n-best list by concatenating the first result of the first segment n-best list with a third result of the second segment n-best list.

17. The one or more machine-readable storage devices according to claim 15, wherein the first segment n-best list comprises a first number of results and the second segment n-best list comprises a second number of results, and the first number is different from the second number.

18. A system for speech recognition comprising:

a set of one or more processors;

a memory unit coupled with the set of one or more processors; and a speech recognition unit operable to, for an expected input string comprising a plurality of expected string segments comprising a first expected string segment and a second expected string segment, receive a first speech segment for the first expected string segment and a second speech segment for the second expected string segment, wherein the first speech segment is different from the second speech segment;

perform speech recognition separately on said first speech segment and said second speech segment, wherein said speech recognition comprises generating a first segment n-best list and a second segment n-best list, the first segment n-best list comprising n highest confidence score results of said speech recognition on the first speech segment, and the second segment n-best list comprising n highest confidence score results of said speech recognition on the second speech segment, where n comprises at least one integer;

generating a global n-best list corresponding to said expected input string, wherein the global n-best list comprises a plurality of results each generated at least in part by combining a result from said first segment n-best list with a result from said second segment n-best list; and determine a final global speech recognition result corresponding to said expected input string, wherein determining said final global speech recognition result comprises pruning results of said global n-best list utilizing a pruning criterion.

19. The system according to claim 18, wherein the first segment n-best list comprises a first number of results and the second segment n-best list comprises a second number of results, and the first number is different from the second number.

20. The system according to claim 18, wherein generating a global n-best list comprises:

generating a first result of the global n-best list by concatenating a first result of the first segment n-best list with a second result of the second segment n-best list; and generating a second result of the global n-best list by concatenating the first result of the first segment n-best list with a third result of the second segment n-best list.

* * * * *

UNITED STATES PATENT AND TRADEMARK OFFICE

CERTIFICATE OF CORRECTION

PATENT NO. : 8,589,162 B2
APPLICATION NO. : 12/234176
DATED : November 19, 2013
INVENTOR(S) : Remi Lejeune et al.

It is certified that error appears in the above-identified patent and that said Letters Patent is hereby corrected as shown below:

On the title page, item [30] “Foreign Application Priority Data,” please add the following:

-- Sep. 19, 2007 (EP) .......... 20070301383 --

In the Specification

Column 1, lines 8-13, should read as follows:

-- This application claims the benefit of priority of ~~French~~ European Patent Application No. EP 20070301383 filed on Sep. 19, 2007, and entitled “Method, system and computer program for enhanced speech recognition of digits input strings” hereby incorporated by reference herein to the maximum extent allowable under the law. --

Signed and Sealed this
Eighteenth Day of February, 2014

Michelle K. Lee
*Deputy Director of the United States Patent and Trademark Office*